(12) United States Patent
Bruck et al.

(10) Patent No.: US 8,807,519 B2
(45) Date of Patent: Aug. 19, 2014

(54) VALVE IN PARTICULAR A PROPORTIONAL PRESSURE RELIEF VALVE

(75) Inventors: Peter Bruck, Althornbach (DE); Markus Bill, Heusweiler (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 1015 days.

(21) Appl. No.: 11/920,237

(22) PCT Filed: Apr. 1, 2006

(86) PCT No.: PCT/EP2006/002997
§ 371 (c)(1),
(2), (4) Date: Jan. 7, 2009

(87) PCT Pub. No.: WO2006/122610
PCT Pub. Date: Nov. 23, 2006

(65) Prior Publication Data
US 2009/0301578 A1    Dec. 10, 2009

(30) Foreign Application Priority Data

May 18, 2005 (DE) .......................... 10 2005 022 693

(51) Int. Cl.
*F16K 31/44* (2006.01)
(52) U.S. Cl.
USPC .......................... 251/83; 251/129.19; 251/282
(58) Field of Classification Search
USPC ............ 251/82, 83, 129.19, 282, 281, 129.07
See application file for complete search history.

(56) References Cited

U.S. PATENT DOCUMENTS

| | | | | |
|---|---|---|---|---|
| 959,618 | A * | 5/1910 | Schmidt | 251/129.01 |
| 1,582,938 | A * | 5/1926 | Smith | 251/83 |
| 1,679,898 | A * | 8/1928 | Gilbert | 251/83 |
| 1,712,298 | A * | 5/1929 | Ford | 251/83 |
| 2,296,132 | A | 9/1942 | Wiseley | |
| 2,980,132 | A | 4/1961 | Prijatel et al. | |
| 3,420,493 | A * | 1/1969 | Kraft | 251/82 |
| 3,651,829 | A * | 3/1972 | Frantz | 137/529 |
| 5,496,100 | A | 3/1996 | Schmid | |
| 5,639,061 | A * | 6/1997 | Krauter et al. | 251/129.19 |
| 5,673,980 | A * | 10/1997 | Schwarz et al. | 251/129.02 |
| 6,619,615 | B1 * | 9/2003 | Mayr et al. | 251/129.19 |
| 7,090,311 | B2 * | 8/2006 | Yang | 251/129.02 |
| 7,380,767 | B2 * | 6/2008 | Roll et al. | 251/82 |

FOREIGN PATENT DOCUMENTS

| | | |
|---|---|---|
| DE | 2 014 087 | 11/1970 |
| DE | 31 32 396 | 3/1983 |
| DE | 42 04 417 | 8/1993 |
| DE | 44 04 740 | 8/1995 |

(Continued)

*Primary Examiner* — John K Fristoe, Jr.
*Assistant Examiner* — Andrew J Rost
(74) *Attorney, Agent, or Firm* — Roylance, Abrams, Berdo and Goodman LLP

(57) ABSTRACT

A valve, in particular, a proportional pressure relief valve, includes an electrically controlled solenoid system (10) for the control of an operating part (12, 12a). The operating part cooperates with a valve element (26) extending longitudinally inside a valve housing (24) to release a fluid transport connection path between a fluid inlet (32) and a fluid outlet (34) in its open position and to block the through path in its closed position. An energy store, preferably in the form of a compression spring (58), is arranged between the operating part (12, 12a) and valve element (26) in a free gap between the two and tends to hold the valve element (26) in the direction of its closed position. The operating piece (12a) is embodied as a guide piston having a longitudinal guide for the valve element (26).

13 Claims, 2 Drawing Sheets

(56) References Cited

FOREIGN PATENT DOCUMENTS

| DE | 44 16 279 | 11/1995 |
|----|-----------|---------|
| DE | 44 38 334 | 5/1996 |
| DE | 44 38 336 | 5/1996 |
| DE | 195 04 077 | 8/1996 |
| DE | 195 10 288 | 9/1996 |
| DE | 195 24 652 | 1/1997 |
| DE | 101 14 299 | 5/2002 |
| DE | 103 25 178 | 1/2005 |

* cited by examiner

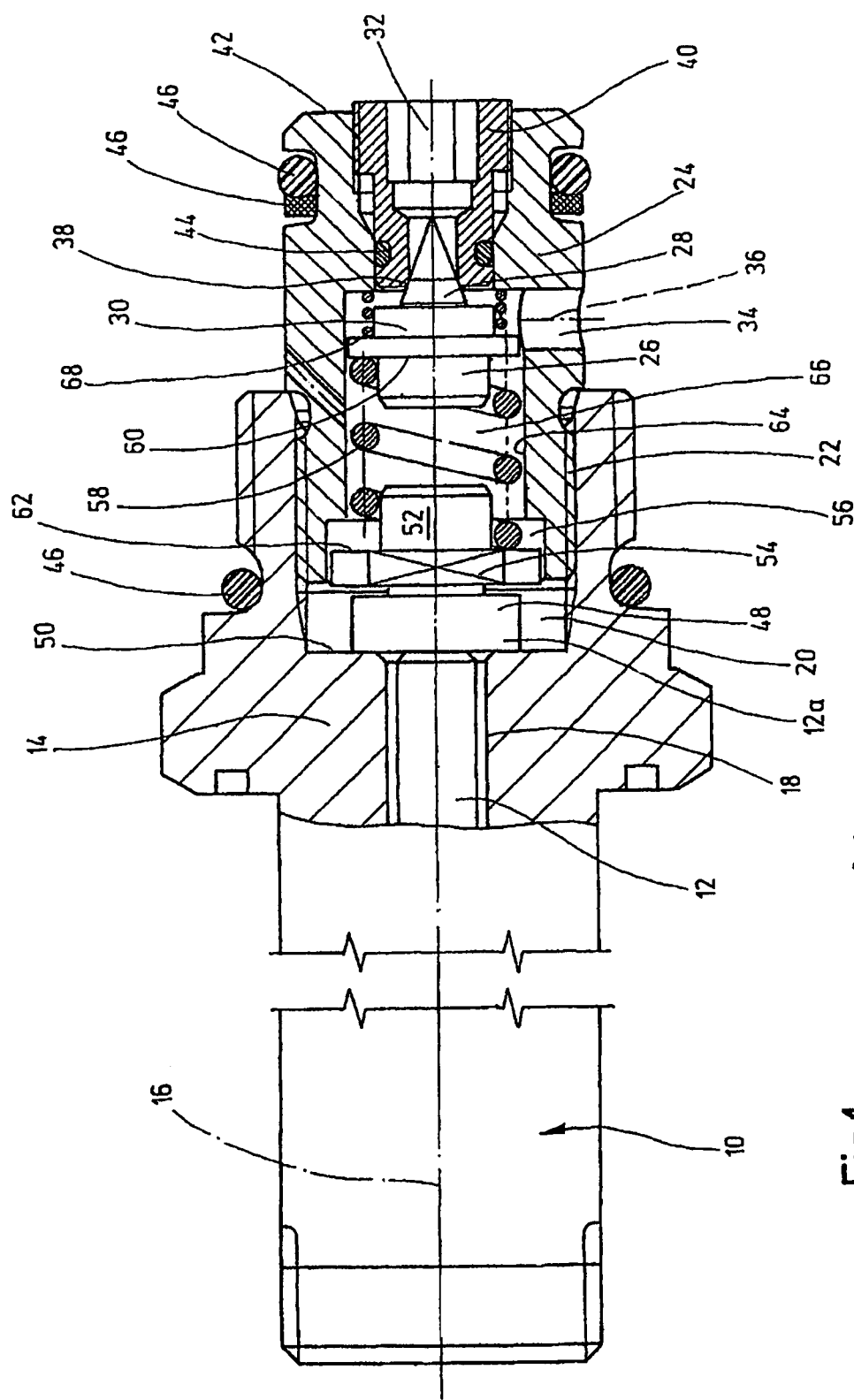
Fig.1 State of the Art

VALVE IN PARTICULAR A PROPORTIONAL PRESSURE RELIEF VALVE

FIELD OF THE INVENTION

The invention relates to a valve, in particular a proportional pressure relief valve, having an electrically triggerable solenoid system for triggering an actuating part to interact with a valve element guided to be longitudinally displaceable in the valve housing. In one of its open positions, the valve element clears a fluid-carrying connecting path between a fluid inlet and outlet. In its blocked position, the valve element blocks this path. Between the actuating part and the valve element, an energy storage device, preferably in the form of at least one compression spring, seeks to keep or biases the valve element in the direction of its closed position.

BACKGROUND OF THE INVENTION

In fluid systems the pressure relief valve is designed to limit the system pressure to a certain predetermined pressure level. When this predetermined value is reached, the pressure relief valve responds and routes the excess volumetric flow, that is to say, the difference flow between the pump flow and consumer flow, from the fluid system toward the tank side. In addition to the pilot-controlled pressure relief valves which will not be explained in greater detail. Directly controlled pressure relief valves, viewed dynamically, act as a spring-mass system executing vibrations when set into motion. These vibrations also act on the prevailing fluid pressure and must be balanced appropriately by damping. In this connection, the impulse forces of the fluid flow are used to virtually balance the increase of the spring force in operation of the valve.

To obtain good pressure setting and a flat $\Delta p$-Q characteristic (pressure increases as small as possible with increasing volumetric flow) over the entire pressure range, the entire pressure range can be divided into pressure increments. The maximally adjustable pressure is determined from the maximum magnetic force (force at the rated current of the solenoid system) and the area of the valve seat active for pressure (circular area of the seat diameter) according to the following formula:

$$p_{max} = \frac{F_{Magnet,max}}{A_{seat}} = \frac{F_{Magnet,max} \cdot 4}{D_{seat}^2 \cdot B}$$

In a plurality of embodiments of these valves, providing an electrically triggerable solenoid system with an actuating coil to trigger the valve element is known in the prior art.

In one known solution available on the market, the valve element in the form of a closing part with a tapering closing cone is directly tied to the rod-shaped actuating part of the solenoid system. In operation of the valve, this arrangement can lead to instabilities due to the mass inertia of the armature in the form of an actuating part. The resulting friction between the actuating part and the valve closing element also leads to increased hysteresis in valve operation.

In the prior art it has already been proposed, to stop this unstable behavior, that the solenoid system be decoupled from the actual valve unit by an energy storage device in the form of a compression spring supported on the end sides on the interior of the valve housing and on the valve element itself to avoid instabilities. Based on dimensional tolerances alone, in particular for increasing fluid volumetric flows, angular displacements between the axis of the closing cone and the actual direction of travel of the valve closing element occur. The closing cone then may not be able to exactly block or could even damage the edge of the valve seat assigned to it in the housing, with the result that the valve then can no longer effect a leak-proof seal.

SUMMARY OF THE INVENTION

An object of the invention is to provide an improved valve ensuring stable control behavior and leak-proof operation, with simultaneously low production and maintenance costs.

This object is basically achieved by a valve where the actuating part is made in the manner of a guide piston having a longitudinal guide for the valve element. The solenoid system is for the most part decoupled from the valve element in terms of mass inertia so that instabilities in operation of the valve do not occur. In addition, the longitudinal guide results in the valve element with the closing part preferably interacting and moving in the seat execution with a valve seat in the valve housing always with axial precision into its intended closed position. The angular displacements occurring in the prior art and causing leaks in the region of the valve seat are then reliably prevented. Due to the decoupling via the energy storage device, preferably in the form of at least one compression spring, the valve according to the invention fundamentally works in a force-controlled manner. If in operation the described dynamic effects occur, they are balanced by the energy storage device in the form of the compression spring. In this way, the valve element with its closing part is therefore influenced by the mass inertia of the armature undertaking triggering to a much smaller degree than in the known described solutions.

The valve according to the invention requires few components and is reliable over a longer period of use so that production and maintenance costs can be kept correspondingly low.

The valve according to the invention is used as a proportional pressure relief valve in the seat execution and in direct triggering, preferably for small fluid volumetric flows up to approximately 10 l/min. The valve can also and preferably be used in pilot control tasks, for example, to build pilot-controlled pressure relief or pressure control systems.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale:

The valve according to the invention will be detailed below using one embodiment as shown in the drawings. The figures are schematic and not to scale.

FIG. 1 is a front elevational view partially in section of a valve in the form of a proportional pressure relief valve according to the prior art;

DETAILED DESCRIPTION OF THE INVENTION

Figures 2, 3:
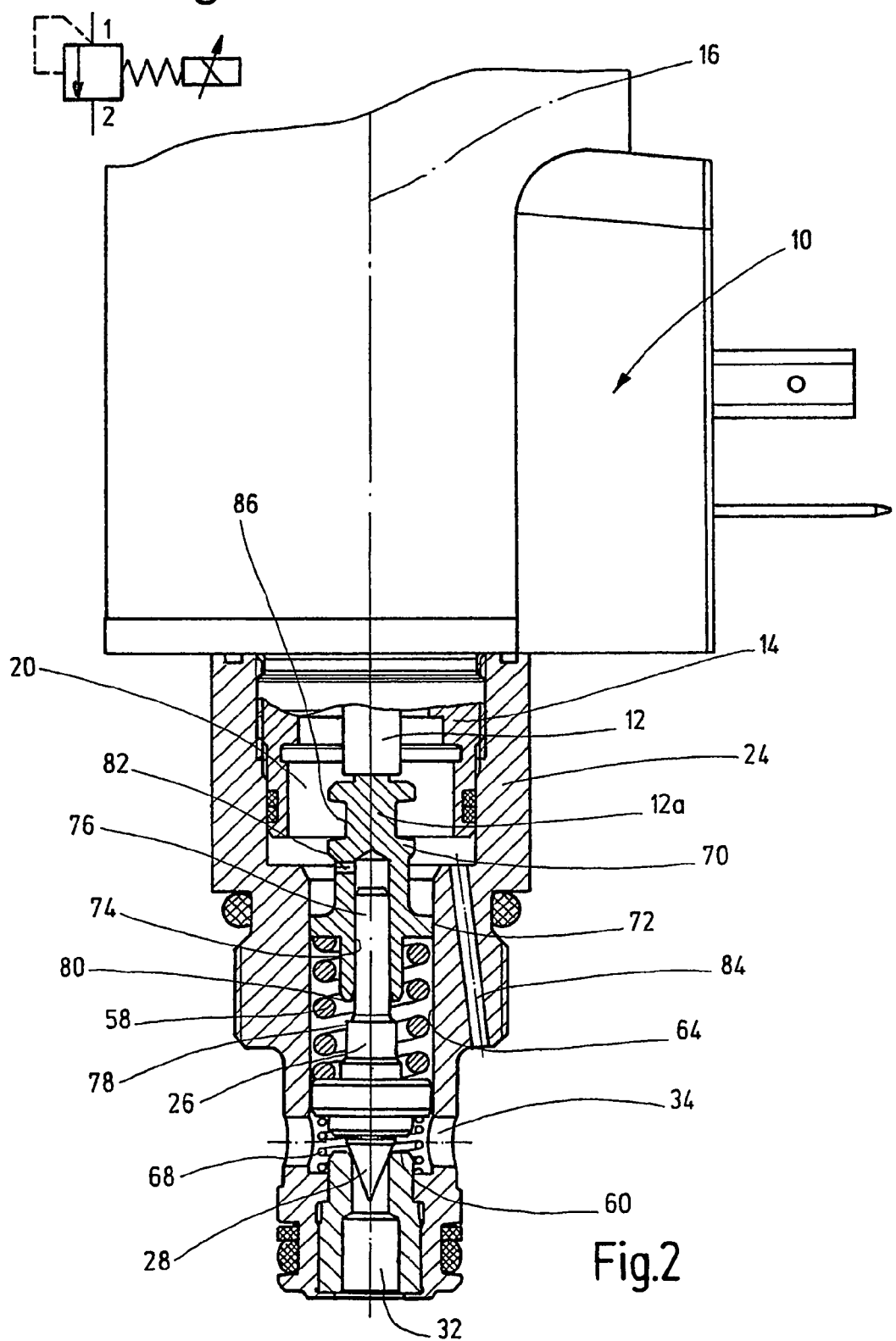
FIG. 2 is a front elevational view partially in section of a valve according to an exemplary embodiment of the invention.
FIG. 3 is a hydraulic graphic symbol for the valve according to the invention.

The known, directly controlled proportional pressure relief valve in the seat execution as shown in FIG. 1 is provided with an electrically triggerable or actuatable solenoid system 10. These solenoid systems for triggering valves are sufficiently known in the prior art (DE 44 16 279 A1). By an actuating coil (not shown) of the solenoid system 10, an armature in the form of a rod-shaped actuating part 12 can be triggered in the manner of a piston part. In the illustrated embodiment the solenoid system 10 is made as a compressing magnet. In the energized state it moves the actuating part 12 viewed in the direction of FIG. 1 from left to right. In the de-energized state the actuating part 12 is reset again via an energy storage device configuration as described below.

The housing 14 of the solenoid system 10 is designed as a screw-in cartridge. Along the longitudinal axis 16 of the valve, housing 14 has a center hole 18 through which the rod-shaped actuating part 12 extends. This center hole 18 at its free end discharges or opens into a widening space 20 with an internal thread 22 into which a correspondingly made valve housing 24 with its outside thread can be screwed. Within the valve housing 24 along the longitudinal axis 16, a valve element 26 is guided to be longitudinally displaceable and has a closing cone 28 and an adjacent valve closing element 30.

In its illustrated position the valve element 26 closes the possible fluid path between a fluid inlet 32 and a fluid outlet 34. The fluid inlet 32 is located on the face side on the free end of the valve housing 24 and extends coaxially to the longitudinal axis 16 of the valve. The fluid outlet 34 conversely is designed as a transverse hole extending through the valve housing wall with its axis 36 perpendicular to the longitudinal axis 16. To leave its blocking position, the valve element 26, viewed in the direction of FIG. 1, must be moved to the left in one of its open positions in which the fluid path is then cleared. In this connection the closing cone 28 is raised off an annular contact surface 38 as the valve seat of a valve insert 40. This valve insert 40 encompasses the fluid inlet 32 of the valve and can be inserted, in particular screwed, into the free end of the remaining valve housing 24 with a capacity to be adjusted lengthwise to the longitudinal axis 16 and to the possible direction of travel of the closing cone 28 by an external thread 42.

This longitudinal adjustment of the valve insert 40 allows precision positioning for the valve seat 38 and thus precision matching. This adjustment refers to the insertion behavior when the valve cone 28 is being closed on the valve seat 38. The plug-like valve insert 40 on the outer peripheral side has a gasket 44 in a groove recess. Further annular sealing systems 46 are located on the outer peripheral side on the solenoid system housing 14 and on the free end of the valve housing 24 to make the overall valve system as a screw-in valve.

As is furthermore to be seen from FIG. 1, another actuating part 12a is connected to the rod-shaped actuating part 12 as a second piston part. On its side facing the rod-shaped actuating part 12, actuating part 12a has a cylindrical contact flange 48 with a cross section widened in diameter and, in the illustrated graphic representation, is supported on the adjacent wall surface 50 of the housing 14 of the solenoid system 10. On its side opposite the actuating part 12, the contact flange 48 is connected to a guide part 52 having a screw-in section (not shown) along which an adjusting nut 54 can be adjusted. To implement this adjustment, the valve housing 24 has a widening recess 56 with a round cross section. Between the actuating part 12a and the valve element 26, an energy storage device in the form of a compression spring 58 is provided. This compression spring 58 with its spring force seeks to keep or biases the valve element 26 to its closed position shown in the figure.

The valve element 26 also has a contact surface 60 widening in diameter but smaller in diameter than the adjacent contact surface 62 of the actuating part 12a. Between the contact surfaces 60, 62 the compression spring 58 extends with its two ends facing away from one another. As seen in FIG. 1, between the sides of the actuating part 12a and valve element 26 facing one another adjacently, there are no structural components except for the edge boundary formed by the inside periphery 64 of the valve housing 24. A cavity 66 is formed between the facing sides of the actuating part 12a and valve element 26.

To be able to achieve reliable lifting of the closing cone 26 off the valve seat 38 when fluid enters via the fluid inlet 32, this lifting motion is supported by another energy storage device in the form of another compression spring 68. Spring 68 has a much smaller spring stiffness than compression spring 58. Furthermore, the spring force behavior of compression spring 58 and compression spring 68 can be analogously adjusted via the adjusting nut 54 before the valve is started. To avoid obstacles in operation, the rod-like actuating part 12 is made only in loose contact with the facing end side of the other cylindrical actuating part 12a and is not connected integrally to it. To ensure uniform fluid intake via the inlet site 32, the inflow cross section viewed in the direction of FIG. 1 tapers from right to left. Cavity 66 in the longitudinal direction parallel to the longitudinal axis 16 of the valve is dimensioned such that in any case the most closely adjacent sides of the actuating part 12a and valve element 26 cannot abut one another, but are actively kept apart by the compression spring 58 even if it assumes a very widely compressed position.

With the pressure relief valve according to the invention, pressure values can be stipulated via direct triggering. When they are exceeded at the fluid inlet 32 against the magnet force of the solenoid system 10 and against the force of the compression spring 58, the closing cone 28, supported by the other compression spring 68, is raised off the valve seat 38 and clears the fluid path from the fluid inlet 32 to the fluid outlet 34 (tank side). In the reverse direction of force, when the pressure is dropping on the fluid inlet side 32, the valve can be closed again via the closing cone 28.

With the known solution, except for the compression spring 58, essentially massless decoupling from the solenoid system 10 relative to the actual valve system with the valve element 26 is achieved. The mass inertia of the armature in the form of the actuating parts 12, 12a is then actively reduced via the interposed energy storage device (compression spring 58). Due to the dimensional tolerances of the compression spring, especially when the volumetric flows are rising, angular displacements can occur between the closing cone 28 and the longitudinal axis 16 of the actual valve body. This structure results in the previously described problems. Especially, the closing cone 28 can damage the edge of the valve seat 38 such that the valve no longer effects a leak-proof seal, clearly adversely affecting serviceability of the valve.

The valve solution according to the invention as shown in FIG. 2 avoids this problem with the structural features described individually below. To avoid repetition, the same components as in FIG. 1 of the prior art are reproduced with the same reference symbols. The statements made previously then also apply to the exemplary embodiment according to the invention as shown in FIG. 2.

The actuating part 12a is designed as a guide piston 70 having a longitudinal guide for the valve element 26. For this purpose, the guide piston 70 first has an outside guide 72 displaceable along the inside periphery or surface 64 of the valve housing 24 and has an inside guide or surface 74 in which parts of the valve element 26 are guided and engage. The inside guide 74 is formed from a center hole or bore in the guide piston 70 extending along the longitudinal axis 16 of the valve housing 24. The parts of the valve element 26 to be guided are formed from a guide journal or pin 76 which, as shown in FIG. 2, engages the center hole. The outside guide 72 is made short in the axial direction to keep friction values low. The shoulder-shaped outside guide 72 is located in the lower half of the guide piston 70 facing the compression spring 58.

The axial length of the center hole is selected to be greater than the length of the cylindrical guide journal 76. The guide journal 76 is provided in the direction to the closing cone 28 with a stop shoulder 78 limiting the travelling path of the end 80 of the guide piston 70 which is free on the face side for this purpose. The energy storage device in the form of a compression spring 58 extends between the outside guide 72 of the guide piston 70 and the contact surface 60 of the valve element 26. Analogous to FIG. 1, in FIG. 2 the valve is shown in its closed position. In the direction of its open position, the travel path of the valve element 26 viewed in the direction of FIG. 2 is bordered to the top by the contact shoulder 78. To be able to equalize the pressure, the guide piston 70 is penetrated by a transverse hole 82 connecting the interior of the center hole to the widening space 20. This widening space 20 in the valve housing 24 has a connecting hole 84 extending obliquely down and used as a leak drain. In the embodiment shown in FIG. 2, the valve housing 24 on the outer peripheral side extends over the housing 14 of the solenoid system 10. To keep the mass of the guide piston 70 moved low, the piston in the region of the contact surface toward the rod-shaped actuating part 12 of the solenoid system 10 has an annular recess 86. The guide piston 70 is kept very slender and has one shoulder-shaped widening on its outer peripheral surface solely to produce the outside guide 72.

According to the invention, via the compression spring 58 massless decoupling from the solenoid system 10 relative to the actual valve system with the valve element 26 is achieved. The mass inertia of the armature in the form of the actuating parts 12, 12*a* is actively reduced via the interposed energy storage device (compression spring 58). Instabilities of the system, as can occur, for example, due to the large fluctuations of pressure or volume and by pulsations on the fluid inlet 32, can be effectively controlled to ensure operating reliability of the pressure relief valve in a wide range.

In the illustrated embodiment shown in FIG. 2, both contraction of the spring 58 via the inner guide and movement of the complete spring assembly in the valve body are possible. The decoupling spring 58 is made very stiff. As a result, the valve works fundamentally force-controlled. Moreover, the indicated guidance results in the valve element 26 with its closing part 28 always traveling with axial precision into its intended closing position. The angular displacements occurring in the prior art with leaks due to damage to the valve seat 38 are then reliably avoided.

The valve according to the invention works very reliably and operates with few components, helping to reduce production costs. The valve can be used for a long time to reduce maintenance costs. The proportional pressure relief valve can generally be used as a pressure relief valve for small volumetric flows (up to 10 l/min). The valve is also preferably used in pilot control tasks, for example, to build pilot-controlled pressure relief or pressure control systems.

While one embodiment has been chosen to illustrate the invention, it will be understood by those skilled in the art that various changes and modifications can be made therein without departing from the scope of the invention as defined in the appended claims.

What is claimed is:

1. A valve, comprising:
an electrically actuatable solenoid system having an actuating part with movable guide piston, said guide piston having an outer guide and an inner guide;
a valve housing having a longitudinal axis and having a fluid inlet and a fluid outlet connected by a fluid conveying connection path through said housing, said fluid inlet having a surrounding contact surface, an inside periphery of said housing engaging and guiding said outer guide during longitudinal movement of said guide piston in said housing, a space inside said housing about said guide piston and on a side of said guide piston remote from the said fluid inlet and said fluid outlet and out of fluid communication with said fluid inlet and said fluid outlet;
a valve element actuatable by said actuating part and movable within said housing along said longitudinal axis between an open position opening said fluid conveying connection path from said inlet to said outlet and a closed position blocking said fluid conveying connection path, a guided part of said valve element slidably received and engaged in said inner guide, said valve element having a closing cone ending in a conically extending point on a side thereof facing said fluid inlet;
a transverse hole extending through said guide piston providing fluid communication between said inner guide and said space and being spaced from said guided part;
a first compression spring located laterally between said inner guide and said inside periphery of said housing and extending axially between and engaging a contact surface of said guide piston and a first contact surface of said valve element at any distance therebetween and biasing said valve element to the closed position engaging said contact surface of said housing; and
a second compression spring extending axially between a side of said valve element remote from said first compression spring and an inside surface of said valve housing adjacent said fluid inlet.

2. A valve according to claim 1 wherein
the valve is a proportional pressure relief valve.

3. A valve according to claim 1 wherein
said inner guide comprises a center bore in said guide piston; and
said guided part of said valve element comprises a guide pin engaged in said central bore.

4. A valve according to claim 3 wherein
said center bore has an axial length greater than an axial length of said guide pin, said guide pin having a stop shoulder adjacent an end thereof proximate said closing cone limiting a path of travel on an end of said guide piston.

5. A valve according to claim 1 wherein
said first compression spring has a high spring stiffness.

6. A valve according to claim 1 wherein
said second compression spring has a smaller spring stiffness than said first compression spring.

7. A valve according to claim 1 wherein
said actuating part comprises first and second piston parts, said first piston part being directly actuated by said solenoid system, said second piston part being actuated by said first piston part.

8. A valve according to claim 1 wherein
said outer guide comprises a radial flange and having said contact surface of said guide piston.

9. A valve according to claim 1 wherein
said closing cone contacts a valve seat in said valve housing about said valve inlet.

10. A valve according to claim 1 wherein
said second compression spring directly engages a second contact surface of said valve element.

11. A valve according to claim 10 wherein
said closing cone and said second contact surface are fixed portions of said valve element.

12. A valve housing according to claim 1 wherein said second compression spring directly engages said inside surface; and said inside surface is fixed in said housing.

13. A valve according to claim 12 wherein said inside surface is a unitary, one-piece portion of said housing.

\* \* \* \* \*